US010766754B2

(12) United States Patent
Clüsserath

(10) Patent No.: US 10,766,754 B2
(45) Date of Patent: Sep. 8, 2020

(54) METHOD FOR PACKAGING LIQUID PRODUCTS UNDER PRESSURE IN PLASTIC BOTTLES OR SIMILAR CONTAINERS

(71) Applicant: KHS GmbH, Dortmund (DE)

(72) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 706 days.

(21) Appl. No.: 14/767,128

(22) PCT Filed: Feb. 5, 2014

(86) PCT No.: PCT/EP2014/000314
§ 371 (c)(1),
(2) Date: Aug. 11, 2015

(87) PCT Pub. No.: WO2014/124738
PCT Pub. Date: Aug. 21, 2014

(65) Prior Publication Data

US 2016/0002018 A1 Jan. 7, 2016

(30) Foreign Application Priority Data

Feb. 13, 2013 (DE) ........................ 10 2013 101 407

(51) Int. Cl.

| | |
|---|---|
| ***B67C 7/00*** | (2006.01) |
| ***B29C 49/00*** | (2006.01) |
| ***B65B 3/10*** | (2006.01) |
| ***B65B 55/10*** | (2006.01) |
| ***B65B 63/08*** | (2006.01) |

(Continued)

(52) U.S. Cl.
CPC ........ *B67C 7/0073* (2013.01); *B29C 49/0005* (2013.01); *B29C 49/66* (2013.01); *B65B 3/10* (2013.01); *B65B 55/10* (2013.01); *B65B 63/08* (2013.01); *B29C 49/06* (2013.01); *B29C 49/08* (2013.01); *B29C 2035/1616* (2013.01); *B29C 2049/4697* (2013.01); *B29C 2049/6653* (2013.01); *B29C 2049/6661* (2013.01); *B29K 2067/003* (2013.01); *B29K 2101/12* (2013.01);
(Continued)

(58) Field of Classification Search
None
See application file for complete search history.

(56) References Cited

U.S. PATENT DOCUMENTS 3,040,493 A * 6/1962 Wheaton .............. B65B 7/2807 141/92
7,900,422 B2 * 3/2011 Fischer ................ B67C 7/0073 53/167

(Continued)

FOREIGN PATENT DOCUMENTS

DE 199 56 186 5/2001
DE 19956186 A1 * 5/2001 ............ A61L 2/208

(Continued)

*Primary Examiner* — Hemant Desai
*Assistant Examiner* — Tanzim Imam
(74) *Attorney, Agent, or Firm* — Occhiuti & Rohlicek LLP

(57) ABSTRACT

A method for packaging liquid products under pressure in thermoplastic containers includes blow-molding a container from a sterilized preform, exposing an exterior of the container to a mixture that includes liquid coolant and either a sterilizing agent or a disinfectant, pressure-filling the container with liquid product, and sealing the filled container.

18 Claims, 2 Drawing Sheets

(51) Int. Cl.

| | |
|---|---|
| ***B29C 49/66*** | (2006.01) |
| *B29L 31/00* | (2006.01) |
| *B29C 49/46* | (2006.01) |
| *B67C 3/22* | (2006.01) |
| *B29C 49/08* | (2006.01) |
| *B29K 101/12* | (2006.01) |
| *B29C 49/06* | (2006.01) |
| *B29C 35/16* | (2006.01) |
| *B29K 67/00* | (2006.01) |

(52) U.S. Cl.
CPC . *B29L 2031/7158* (2013.01); *B67C 2003/227* (2013.01)

(56) References Cited

U.S. PATENT DOCUMENTS

| | | | | |
|---|---|---|---|---|
| 8,092,757 | B2 * | 1/2012 | Adriansens | A61L 2/208 264/252 |
| 2003/0032191 | A1 * | 2/2003 | Hilson | G01N 35/00029 436/47 |
| 2005/0288429 | A1 * | 12/2005 | Rymer | C08J 3/18 524/557 |
| 2006/0019037 | A1 * | 1/2006 | Zoppas | B05C 3/09 427/430.1 |
| 2006/0174922 | A1 * | 8/2006 | Mader | A01J 7/02 134/42 |
| 2007/0084650 | A1 * | 4/2007 | Schwei | A61L 2/186 422/1 |
| 2008/0152538 | A1 * | 6/2008 | Quetel | A61L 2/04 422/28 |
| 2009/0126394 | A1 * | 5/2009 | Krog | F25D 3/08 62/399 |
| 2009/0317506 | A1 * | 12/2009 | Adriansens | A61L 2/04 425/103 |
| 2010/0054987 | A1 * | 3/2010 | Krueger | A61L 2/082 422/3 |
| 2010/0089009 | A1 * | 4/2010 | Till | A61L 2/087 53/452 |
| 2010/0136160 | A1 * | 6/2010 | Quetel | B29C 49/46 425/547 |
| 2010/0172795 | A1 * | 7/2010 | Lothar | A61L 2/04 422/28 |
| 2010/0272922 | A1 * | 10/2010 | Revankar | C01B 33/035 427/588 |
| 2010/0305559 | A1 * | 12/2010 | Brannan | A61B 18/18 606/33 |
| 2011/0014093 | A1 * | 1/2011 | Ono | A61L 2/18 422/292 |
| 2011/0033710 | A1 * | 2/2011 | Kenmochi | B29C 65/44 428/416 |
| 2011/0044849 | A1 * | 2/2011 | Infiesta | A61L 2/22 422/28 |
| 2011/0077633 | A1 * | 3/2011 | Bonn | A61B 18/1815 606/33 |
| 2011/0094616 | A1 * | 4/2011 | Hayakawa | B67C 3/242 141/1 |
| 2011/0169188 | A1 | 7/2011 | Derrien et al. | |
| 2011/0219728 | A1 * | 9/2011 | Humele | B29C 49/42 53/452 |
| 2011/0285063 | A1 * | 11/2011 | Chauvin | B29C 49/46 264/525 |
| 2013/0074979 | A1 * | 3/2013 | Krulitsch | B67C 3/2608 141/5 |
| 2013/0133297 | A1 * | 5/2013 | Adriansens | B29C 49/46 53/558 |

FOREIGN PATENT DOCUMENTS

| | | | | | |
|---|---|---|---|---|---|
| DE | 10 2006 05319 | | | 5/2008 | |
| DE | 10 2008 03212 | | | 1/2010 | |
| DE | 102008032123 | | * | 1/2010 | B08B 9/34 |
| DE | 102010022875 | A1 | * | 12/2011 | B67C 3/2608 |
| EP | 1 944 151 | | | 7/2008 | |
| EP | 2261169 | A1 | * | 12/2010 | B65B 55/10 |
| EP | 2 447 038 | | | 5/2012 | |
| WO | WO 2007/019671 | | | 2/2007 | |
| WO | WO2010/003973 | | | 1/2010 | |

* cited by examiner

METHOD FOR PACKAGING LIQUID PRODUCTS UNDER PRESSURE IN PLASTIC BOTTLES OR SIMILAR CONTAINERS

RELATED APPLICATIONS

This application is the national stage, under 35 USC 371, of PCT application PCT/EP2014/000314, filed on Feb. 5, 2014, which claims the benefit of the Feb. 13, 2013 priority date of German application DE 102013101407.0, the contents of which are herein incorporated by reference.

FIELD OF INVENTION

The invention relates to packaging beverages, and in particular, to cooling bottles before filling them.

BACKGROUND

It is known to provide interlocking forms for packaging liquid products under pressure in bottles made of a thermoplastic, in particular made of PET (polyethylene terephthalate). In some known installations, bottles are made in a blow-molding machine from previously sterilized or disinfected and pre-heated preforms. They are then filled in a filling machine by pressure-filling with a carbonated product. Finally, the bottles are sealed in a sealing unit of the installation.

Since the bottles arrive at the filling machine after having recently left the blow-molding machine, they are still quite hot. It is generally desirable to cool the bottles before attempting to fill them.

SUMMARY

The invention provides a method for packaging liquid products under pressure, and in particular, liquid products containing $CO_2$, in bottles and to do so while maintaining high performance while allowing a simplified and compact structural design.

The method allows the packaging of pressurized liquid products into bottles made of a thermoplastic, in particular of PET. The cooling of the still empty bottles and the sterilizing or disinfection of these bottles not only on the bottle base but, preferably, also over their exterior, particularly in areas in which the sterilizing of the preforms is not effective, takes place simultaneously in one and the same process step or at one and the same working position with a single medium, namely with the liquid coolant containing the disinfectant. This results in structural simplification, It also creates the possibility of shortening the transport and treatment section between the blow-molding machine and the filling machine necessary for a compact construction of the installation.

The liquid coolant can be water, an aqueous solution, sterile water, de-ionized water, or de-mineralized water.

In some embodiments, a suitable disinfectant is chlorine dioxide at a reduced concentration that is nonetheless still adequate for the microorganism reduction sought, for example at a concentration of 0.5-3 ppm in the liquid coolant.

Finely atomized liquid coolant is applied from below onto containers that are suspended from an area near their container mouths. In some practices, the atomized coolant is an aerosol made with a sterile gaseous and/or vaporous medium, such as sterile compressed air, under pressure.

In one aspect, the invention features a method for packaging liquid products under pressure in thermoplastic containers includes blow-molding a container from a sterilized preform, exposing an exterior of the container to a mixture that includes liquid coolant and either a sterilizing agent or a disinfectant, pressure-filling the container with liquid product, and sealing the filled container.

In another aspect, the invention features a method for packaging liquid products under pressure in thermoplastic containers. Such a method includes blow-molding a container from a sterilized preform, exposing its interior to a mixture, pressure filling it with liquid product, and then sealing it. The mixture includes a liquid coolant used to cool containers, and either a sterilizing agent or a disinfectant.

In some practices, the mixture includes chlorine dioxide. Among these are practices in which the chlorine dioxide is contained in the liquid coolant at a concentration of 0.5-10 ppm, and other practices in which the chlorine dioxide is contained in the liquid coolant at a concentration of 0.5-3 ppm.

In other practices, the mixture further comprises an additive to reduce surface tension of the liquid coolant. Examples of such additives include surfactants.

Yet other practices include a mixture that has an additive to promote drying of cooled and disinfected containers prior to filling thereof. An example of such an additive is alcohol.

Practices of the invention include those in which the liquid coolant comprises demineralized sterile water, and those in which it includes deionized sterile water.

Other practices include spinning the container after having exposed it to the mixture. This causes a centrifugal force that forces any residual mixture to be flung away from the container, thus promoting drying thereof.

In some practices, exposing an exterior of the container to a mixture comprises exposing a bottle base to the mixture.

Other practices include atomizing the mixture, and spraying the atomized mixture toward the container.

In alternative practices, exposing an exterior of the container to a mixture comprises suspending the container on a transport element between a blow-molding machine and a filling machine, and spraying the mixture toward the container from a spray device that is arranged underneath the transport element.

Yet other alternative practices include causing a container opening of the container to be covered during exposure of the exterior of the container to the mixture.

As used herein, the expressions "substantially" and "approximately" both mean deviations from an exact value in each case by ±10%, and preferably by ±5% and/or deviations in the form of changes that are not significant for function.

As used herein, "high performance" is measured as the number of packaging units produced per unit of time.

BRIEF DESCRIPTION OF THE DRAWINGS

These and other features of the invention will be apparent from the following detailed description and the accompanying figures, in which.

DETAILED DESCRIPTION

Figure 2:
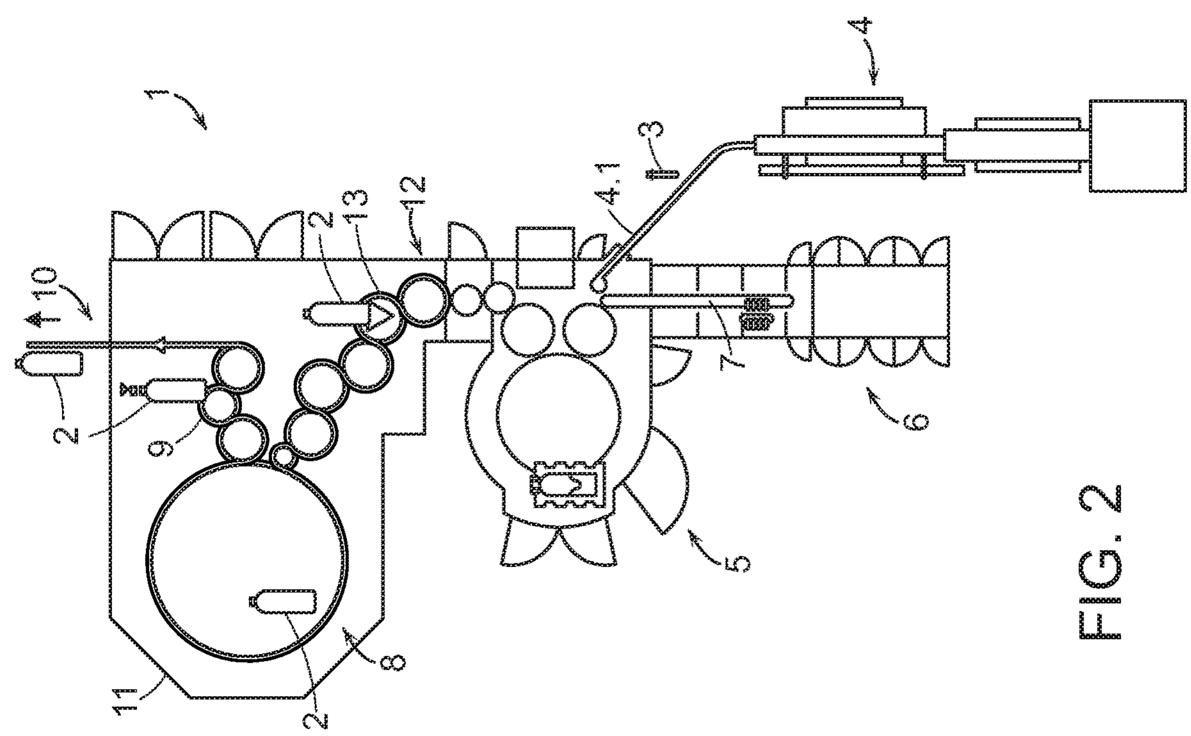
FIG. 2 is a schematic representation, viewed from above, of an installation for producing the packaging units of FIG. 1.

FIG. 2 shows an installation 1 for producing packaging units. In the illustrated embodiment, the packaging unit is a bottle 2 that is made of a thermoplastic. The thermoplastic in some embodiments is PET.

Figure 1:
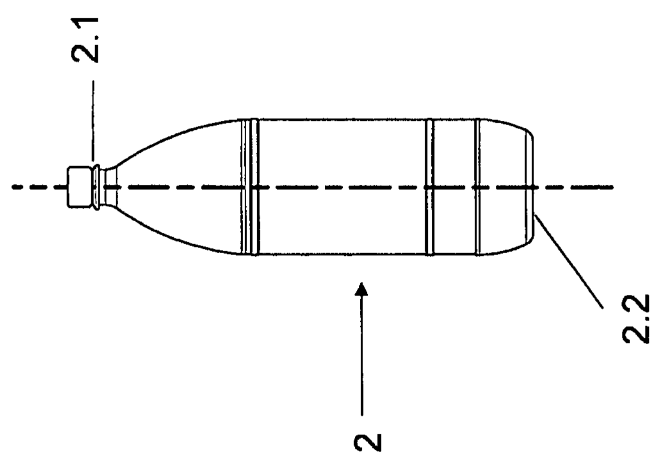
FIG. 1 shows a side view of a sealed packaging unit that has been filled with a liquid bulk material.

The bottle 2, which is shown in FIG. 1, is under pressure, filled with bulk product containing $CO_2$, and sealed. The installation 1 makes the bottles 2 by blow-molding from preforms. It then fills the bottles 2 with the bulk product under pressure. This procedure is called "pressure-filling." Finally, the installation 1 seals the bottle 2.

To carry out these tasks, the installation 1 includes a supply unit 4, a blow-molding machine 5, a filling machine, and a sealing machine 9. The supply unit 4 provides the preforms 3. The blow-molding machine 5 is of a rotating type to which an oven 6 with a pre-heating section 7 has been assigned. The filling machine is a rotating type filling machine having a plurality of filling positions on a rotor and being driven to rotate about a vertical machine axis. The sealing machine 9 follows the filling machine 8 in the direction of transport of the bottles 2 through the installation 1 or at a corresponding sealing unit.

The installation 1 has conveying section 4.1 that carries preforms 3 from the supply unit 4 to the blow-molding machine 5. At the blow-molding machine 5, the preforms 3 are blow-molded into bottles 2. They are then moved toward an outlet 10 of the installation 1. In the course of traveling toward the outlet 10, the bottles 2 pass through a space that is separated from the environment by a housing 11. A sterile medium is passed through this space thus making it a sterile space or hygiene space. The sterile medium is a sterile vaporous and/or gaseous medium at slight over-pressure, preferably with sterile air at slight over-pressure.

In operation, preforms 3 are fed by means of the conveying section 4.1 to the pre-heating section 7, where they are pre-heated. While still hot, the preforms 3 are then fed to an inlet of the blow-molding machine 5. Before being transferred to the blow-molding machine, the preforms 3 are sterilized with an appropriate medium. The medium can be a gaseous medium, a vaporous medium, and/or a liquid medium.

The empty bottles 2 thus produced are moved over a transport section 12, which can be seen in FIG. 2. The transport section 12 includes multiple transport stars 13 that are disposed in series relative to the direction of transport of the bottles 2 from the blow-molding machine 5 to the filling machine 8. The transport stars 13 suspend bottles 2 from mouth flanges 2.1 thereof with the bottle axes oriented in a vertical or substantially vertical direction.

When transferred to the transport section 12, the empty bottles 2 have just been blow-molded. They are therefore still quite hot. In fact, they are at a temperature of at least 75° C. to 80° C.

Before the pressure-filling in the filling machine 8, the bottles 2 need to be cooled down to a temperature at which the thermoplastic plastic used for the bottles is adequately stable. For example, the temperature should be brought down to a temperature of 55° C. or lower.

Figure 3:
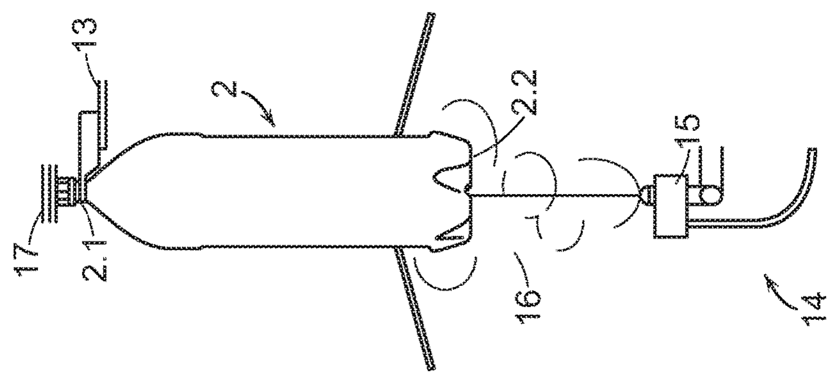
FIG. 3 is a simplified representation of a vertical section through a transport section of the installation shown in FIG. 2.

To bring down the temperature, the apparatus features at least one spray device 14 with at least one spray nozzle 15, both of which are shown in FIG. 3. The spray device 14 is provided either on the transport section 12 or under at least one transport star 13 and underneath the path of movement of the empty bottles 2.

The spray nozzle 15 emits a coolant mist 16 that is made of finely distributed or atomized droplets of a liquid coolant. The liquid coolant is preferably water at a temperature that is well below 55° C., for example at a temperature of no greater than 20° C. This coolant mist 16 comes from below the bottles 2. As a result, it directly impinges on the bottle bases 2.2. This is particularly advantageous because the bottle base 2.2 has an enlarged wall thickness. As a result, the bottle base 2.2 cools more slowly. It is therefore expedient to direct considerable coolant mist 16 directly onto the bottle base 2.2.

In those embodiments in which the nozzle arrangement has multiple spray nozzles 15 in series along the direction of transport of the bottles 2, the nozzles 15 are offset relative to each other along an arched transport section of the transport star 13.

In some embodiments, the spray nozzles 15 are atomizer nozzles. Liquid coolant, such as water, together with an optional sterile medium is applied under pressure so that the coolant mist 16 forms an aerosol that is directed toward the undersides of the containers 2. Embodiments include those in which the sterile medium is a gaseous medium and those in which it is a vaporous medium.

Preferably, the liquid coolant includes disinfectant, such as chlorine dioxide. The concentration of chlorine dioxide is selected to be sufficient to effectively sterilize and disinfect the bottles 2 at areas that were not sterilized when the bottle 2 was still a preform 3.

A critical range of chlorine dioxide concentration in the liquid coolant is the range from 0.5 ppm to 10 ppm. Another critical range of chlorine dioxide is that between 0.5 ppm to 3 ppm. Both of these are sufficient to achieve sterilization or disinfection that reduces a microorganism reduction level sought of Log 4-6 for the product-related drink pests while causing no ascertainable adverse impact of the internal surfaces of the bottles 2 and on the quality of the bulk product filled into the bottles 2 occurs. Depending on the kinds of microorganisms, it is advantageous to select a chlorine dioxide concentration that is in another critical range, namely the range between 3 ppm and 10 ppm.

In some embodiments, as shown in FIG. 3, a cover element 17 is placed on the bottle's opening while the bottle 2 is on the transport star 13 and being exposed to the liquid coolant.

In FIG. 2, the particular transport star 13 that has a spray device 14 is shown with a white triangle. As is apparent from the figure, the distance between the spray device 14 and the inlet of the filling machine along the direction of transport of the transport section 12, i.e. along the direction of transport of the bottles 2, is quite far. At least one further transport star 13 is provided between the transport star 13 having the spray device 14 and the inlet of the filling machine 8. In fact, in the illustrated embodiment, there are three such transport stars 13.

An advantage of this arrangement is that even when the number of molded, filled and sealed bottles 2 processed per unit time is high, enough time remains for any residual coolant applied onto the bottles 2 to be removed from the bottles 2. Moreover, as the bottles 2 traverse the various stars 13 following exposure thereof to liquid coolant, they are subjected to considerable centrifugal forces that arise from being transported by rapidly rotating transport stars 13. This promotes shedding of liquid coolant from a bottle 2 prior to entry of that bottle 2 into the filling machine 8.

Additionally, because coolant liquid that is applied onto the bottles 2 is a finely atomized coolant mist 16, a large area of the bottle 2 is cooled. In particular, not only the bottle base 2.2, but also the entire or substantially the entire outer or jacket surface of the particular bottle 2 is impacted with the cooling liquid.

In some embodiments, the liquid coolant is mixed with the gaseous or vaporous medium under pressure. An example of such a medium is sterile compressed air. By passing this mixture through a spray nozzle 15, it is possible to achieve a particularly fine atomization of the coolant, as well as to promote additional cooling by evaporation.

Mixing disinfectant with coolant makes it possible to both cool the bottles 2 and to sterilize or disinfect the bottles 2 on their exterior surfaces at one and the same working position, in one and the same process step, with one and the same medium. This avoids spreading any microorganisms adhering to the exterior of the bottles 2 into the filling machine 8 and, in particular, into product-carrying areas of the filling machine 8. It does so while maintaining a compact design of the installation 1 and its transport section 12.

The installation 1 as described herein thus permits execution of a method for packaging liquid products under pressure into bottles 2 that have just been molded from sterilized preforms 3 by blow-molding, and that have just been cooled with a liquid coolant and furthermore sterilized at the same time, and that are then filled under pressure with the bulk product and sealed.

An alternative method includes adding an additive to reduce the liquid coolant's surface tension. A suitable additive is a surfactant. In some cases, the surfactant and disinfectant are both added to the coolant. The surfactant promotes broader wetting of the surfaces, which in turn promotes faster evaporation and cooling.

Other alternative methods include adding a slightly volatile additive to improve the drying of the cooled and disinfected containers 2. This can be added along with the surfactant. An example of a volatile additive that can be added to the liquid coolant before the filling is alcohol, such as methanol and isopropanol. The concentration of alcohol is insufficient to function as a disinfectant operating at an industrially relevant disinfection rate. However, the alcohol is used at a concentration that is sufficient to promote cooling.

In yet other alternative methods, chlorine dioxide is replaced by a comparably effective disinfectant. Suitable substitutes for chlorine dioxide are peracetic acid and $H_2O_2$ (hydrogen peroxide). These substitutes can be used with a surfactant, a volatile additive, or any combination thereof.

In those cases where hygiene requirements are reduced, the coolant is not mixed with any disinfectant. However, to improve cooling performance, an agent to reduce the surface tension of the liquid coolant is added. A suitable agent would be a surfactant.

Alternatively or in addition to a surfactant, the coolant can be mixed with one or more slightly volatile additives to improve the drying and cooling of the containers 2 before filling, such as for example an alcohol (methanol, isopropanol etc.).

Moreover, these two types of coolant (with and without disinfectant) can be used for a manufacturing and filling method for containers alone or alternatively, i.e. they are used where necessary.

The foregoing embodiments are provided as examples only and are not intended to be limiting. The invention is defined solely by the claims.

Having described the invention, and a preferred embodiment thereof, what is claimed as new, and secured by Letters Patent is:

1. A method comprising packaging a liquid product under pressure in containers, wherein said containers are thermoplastic containers, wherein packaging said liquid product under pressure comprises:

blow-molding a container from a sterilized preform, wherein said container is a thermoplastic container;

exposing an exterior of said container to a mixture;

spraying said mixture toward said container from a plurality of spray nozzles that are located in series along a direction of transport of said container;

after having exposed said exterior of said container to said mixture, pressure-filling said container with said liquid product; and sealing said filled container;

wherein said mixture comprises:

a liquid coolant, a disinfectant, an additive to reduce surface tension of said liquid coolant, and an additive to promote drying of cooled and disinfected containers prior to filling thereof.

2. The method of claim 1, wherein there exists a disinfection rate that has been defined to be an industrially-relevant disinfection rate, wherein said additive to promote drying comprises alcohol, wherein said alcohol is present in an amount such that a concentration of said alcohol is insufficient to function as a disinfectant at said industrially-relevant disinfection rate, and wherein said alcohol is present in an amount that is sufficient to promote cooling.

3. The method of claim 1, further comprising, after exposing said container to said mixture, placing said container on a rotating transfer star to cause centrifugal force that arises from rotation of said transfer star to force residual mixture to be flung away from said container.

4. The method of claim 1, wherein exposing an exterior of said container to a mixture comprises atomizing said mixture and spraying said atomized mixture toward said container.

5. The method of claim 1, further comprising, after having exposed said exterior to said mixture and before pressure-filling said container, causing said container to be carried by a first transport star, wherein said first transport star receives said container after said container's exterior has already been exposed to said mixture.

6. The method of claim 1, further comprising, after having exposed said exterior to said mixture and before pressure-filling said container, causing said container to be carried by a succession of at least three transport stars.

7. The method of claim 1, wherein said containers comprise a bottle that was formed from a preform, wherein there exists an area on said bottle that was formed from a corresponding area on said preform, wherein said corresponding area on said preform was not sterilized, wherein said disinfectant is contained in said liquid coolant at a concentration that is sufficient to effectively sterilize and disinfect said bottle at said area.

8. The method of claim 1, further comprising selecting a concentration of said disinfectant to be sufficient to achieve a log reduction of between 4 and 6 on drink pests while causing no ascertainable adverse impact on an internal surface of said container.

9. The method of claim 1, further comprising selecting said liquid product to be a liquid product that contains carbon dioxide.

10. The method of claim 1, further comprising sterilizing at least a portion of the preform prior to entry of the preform into a blow-molding machine.

11. The method of claim 1, wherein exposing is carried out while said container is on a transport path that begins at a blow-molding machine.

12. The method of claim 1, wherein exposing said exterior of said container to said mixture comprises exposing said exterior to a mist.

13. The method of claim 1, wherein exposing said exterior of said container to said mixture comprises exposing said container to said mixture at a first point along a transport path along which said container travels and exposing said container to said mixture at a second point along said transport path after having exposed said container to said mixture at said first point.

14. The method of claim 1, wherein said exterior of said container comprises a base and an outer surface, wherein exposing said exterior of said container to said mixture comprises exposing said base to said mixture and exposing said outer surface to said mixture.

15. The method of claim 1, further comprising exposing an exterior of another container to a disinfectant-free mixture that comprises a liquid coolant and a surfactant.

16. The method of claim 1, further comprising spraying said mixture toward said container from a spray device that is underneath a transport path that precedes a transport star.

17. The method of claim 1, further comprising causing a delay between completion of blow-molding and initiation of pressure filling, wherein causing a delay comprises causing said container to traverse a series of transport stars, said stars comprising a first star that receives said container after said container has been exposed to said mixture and a last star that provides said container to a filling machine.

18. The method of claim 1, wherein said containers are PET containers.

* * * * *